Aug. 22, 1967 P. H. SCHULTE 3,336,663

PROCESS FOR MANUFACTURE OF MAGNETIC ERASE HEAD

Filed Nov. 1, 1963

INVENTOR
PAUL H. SCHULTE

BY Fisher, Christen, Sabol & Caldwell
ATTORNEYS

United States Patent Office 3,336,663
Patented Aug. 22, 1967

3,336,663

PROCESS FOR MANUFACTURE OF MAGNETIC ERASE HEAD

Paul H. Schulte, D-9 Gardenia, San Francisco Urb., Rio Piedras, Puerto Rico 00927

Filed Nov. 1, 1963, Ser. No. 320,890
4 Claims. (Cl. 29—603)

The present invention relates to a method of manufacturing magnetic erase heads of a type embodying precise gap alinement to external indexing structure incorporated therein.

The process for fabricating such heads produces a highly useable product, fabricatable at minimal cost and in compact design because of the elimination of several heretofore conventional parts. In addition, the processing enables ready mass production of uniform erase heads suitable for employment, per se, or for operative association as one or more components of multiple heads indexed in precise tracking alinement.

Basically, the erase head is formed from a blank of material having a high permeability rating. Each such blank is processed through punch and die operations, which actually form the indexing structure from the external housing, as well as parts of the magnetic paths from the outer housing material.

The gap-forming structure is oriented in precise alinement with the external indexing structure during fabrication through the employment of jigs or fixtures. The internal components are thereafter retained in position by encapsulation. Indexing to the pole piece structure is facilitated by partially cutting out of the housing, sections of the magnetic path and embossing outwardly of the housings the indexing structure in the same dies.

With the foregoing in mind, it is a principal object of the present invention to provide a process whereby erase heads may be manufactured from minimal components by mass production techniques and in units conforming substantially one to another.

It is a further object of the invention to provide such a process for manufacturing erase heads which includes the development of indexing bosses for precise alinement with the pole piece gap-forming structure of the head.

It is yet another object of the invention to provide a process in which erase head housings are fabricated by punching and forming from high permeable blanks to yield mated housing sections for assembly to define magnetic gaps in precise relation to external indexing bosses.

It is a further object of the invention to process indexing bosses in accurate alinement with the erase head gaps as a result of the inherent close tolerances of dies.

It is a stil further object to process such bosses with edges normal to and parallel with the gaps for orienting the erase heads, as to track alinement, as well as gap height alinement in operative association with other heads and/or relative to mounting brackets for the erase heads, per se.

Yet another object and feature of the invention resides in the finishing of the operative face of such an erase head arcuately (radiused off-center) to permit tape wrap about the erase head when it is operatively associated with a record-playback head.

The internal components and their arrangement are clearly described in my co-pending patent application, Ser. No. 320,751, entitled "Magnetic Erase Head," filed concurrently herewith.

The foregoing description will now be amplified in detail in connection with the illustrated process appearing in the accompanying drawing, wherein.

Figure 2:
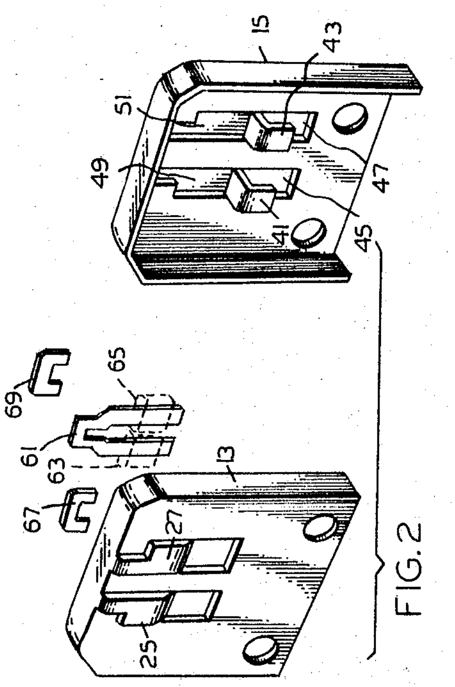
FIG. 2 is a view in perspective of essential components assemblable together to form the head of FIG. 1, as shown in exploded form.
Figure 3:
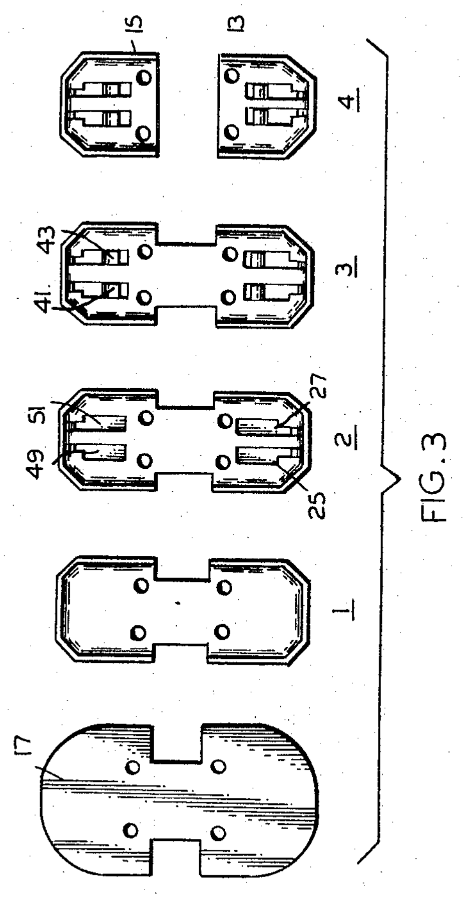
Figure 1:
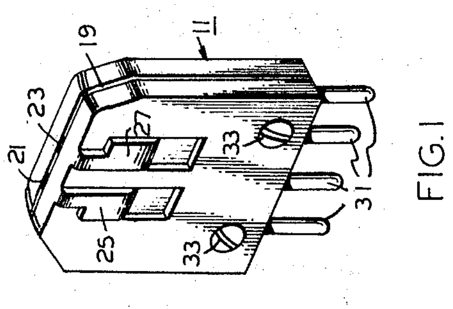
FIG. 1 is a view in perspective of an erase head fabricated in accordance with the principles herein described.

FIG. 3 shows in plan the general formation of a housing by the punch and die stations in developing the housing components depicted in FIG. 2; and, Referring now to the drawing, there is illustrated a finished erase head 11 at FIG. 1. It is comprised of a left hand housing 13 and a right hand housing 15 of similar configuration adapted for association in opposed relation. Each of the housings 13 and 15 is formed by stamping and forming the same from a blank, such as blank 17 shown in FIG. 3, of material having a high magnetic permeability rating.

It may be observed that the two housings 13 and 15 appear slightly separated at the peripheral gap 19, through which the epoxy filling material is visible. It is this latter filler or encapsulating material which maintains assembly in the configuration depicted in FIG. 1.

Also visible, at spaced apart positions along the upper face of the erase head of FIG. 1, are the gaps 21 and 23 deployed in precise alinement with the bosses 25 and 27.

External terminals 31 are provided in connection with the internal components for plug-in attachment of the head. Also mounting screws 33 enable connection of the head to brackets, or as a unit of a multiple head. It may be noted that the screws 33 are not snugly fitted through the erase head, but fit sufficiently loosely with the actual indexing of the head being taken from the bosses 25 and 27.

In FIG. 2 the interior of housing 15 is clearly apparent and shows a pair of inwardly directed and depending projections 41 and 43 which are partially cut from the material of the housing 15 to leave the apertures 45 and 47. Also, the indexing bosses 49 and 51 are formed outwardly of the housing 15.

From FIG. 3 it may be seen that the housings 13 and 15 are simultaneously formed in the same die, the process beginning with the blank 17, shown at station number 1 as generally peripherally flanged. Station number 2 shows the formation of the embossings, later reformed to form the bosses 25 and 27, as well as 49 and 51.

Station number 3 shows the lancing and forming of the inwardly directed and depending projections, such as 41 and 43, for each of the sections which will become the housings 13 and 15; and station number 4 shows the housings 13 and 15 reformed and severed from the blank material. Obviously progressive or compound dies could be employed in lieu of the single station approach described.

The housings 13 and 15 are adapted to be peripherally associated along with the gap-forming structure, generally illustrated in FIG. 2. The single or double laminate pole piece magnetic material configuration 61 is generally shown in U-shaped outline with coils 63 and 65 dotted thereon. Non-magnetic spacers 67 and 69 are adapted to be disposed on either side of the laminate 61 for abutting engagement with the upper edges of the housings 13 and 15, thereby forming the actual gaps.

The lower extremities of the laminates 61 are firmly engaged between the projections, such as 41 and 43 of the housings 13 and 15. The laminate 61 and spacers 67 and 69 extend beyond the upper face of the housings and thus provide portions thereof to be gripped in jigs or fixtures for precise alinement with the bosses 25 and 27. This alinement is maintained while the components are encapsulated and thereafter the upper reaches of the laminate 61 and spacers 67 and 69 are finished off to open up the regions therebetween, thereby forming the separate track gaps 21 and 23. Each of these track gaps includes sequential gaps because of the double non-magnetic spacers 67 and 69. However, the principles of the invention may be carried out with the employment of a single spacer, such as either 67 or 69, to form single gaps for each track. Similarly, monaural heads with single gaps may be processed in the same manner as explained herein, as well as erase heads suitable for multiple tracks, even for computer or industrial usage.

It is important to note that the magnetic return paths for the gaps actually include the external housing material as represented by the housings 13 and 15. When the head is constructed in accordance with the FIG. 2 showing each track includes parallel sequential gaps. The upper ends of the laminate 61, along with the gap spacers 67 and 69, are finished off in perfect alinement with the bosses 25 and 27 whereby the magnetic gaps lie on the face of the erase head and may occupy positions between parallel lines connecting boss 27 to boss 51 and boss 25 to boss 49. The gap widths may exceed the boss widths, but are related in position to the bosses. Alternatively, the head may include a single or a pair of sequential gaps constituting full track gaps. In such an arrangement, the laminate 61 is set lower and not finished entirely through. Similarly, other type functional erase heads can be made based on these principles.

Other and further modifications of the invention will occur to those skilled in the art from a reading hereof and therefore it is desired that the invention not be limited by the disclosure herein, but rather by the appended claims, wherein:

What I claim is:

1. A process for manufacturing erase heads from blanks of material having magnetic permeability comprising the steps of: forming peripherally flanged housing sections adapted to be mated together along the flanged edges; embossing outwardly on each housing section, during forming, indexing structure extending generally to one flanged edge; partly cutting and forming inwardly at spaced apart positions material formed from and still connected to the housing sections to comprise separate magnetic paths in conjunction with each section; disposing magnetic material between the inwardly turned material and mating edges of said one edge of the housing sections with said inwardly turned material of the mated housings sandwiching the magnetic material and including it in said magnetic paths; isolating said magnetic material from the housing sections by disposing non-magnetic material located at said one edge in alinement with said indexing structure; disposing electrical coils on said magnetic material prior to its insertion in the housing sections; and, encapsulating the coils and magnetic material within the housing sections to form a permanent erase head.

2. A method for fabricating a magnetic erase head comprising the steps of: forming a pair of mated housings from a blank of magnetic material; said housings being formed by die techniques; including the steps of peripherally flanging the blank for each housing; embossing the blanks in a direction oppositely of the flanges and adjacent one flange to form indexing bosses; partially cutting portions of the blank at corresponding locations for each housing; forming said portions into inwardly extending and depending projections; associating the mated housings in opposed relation with the flanges in confronting relation and with non-magnetic material defining gaps between said one flange in alinement with the bosses; and establishing magnetic paths through the housings including the projections and across the magnetic gaps therebetween by disposing flux producing coil means within the housings and magnetic means through the coil means, sandwiched between the depending projections, and in contact with the non-magnetic material.

3. The method of claim 2 including the steps of embossing the housings in similar locations in precise alinement with the magnetic path gaps.

4. A method of forming a magnetic erase head comprising the steps of: peripherally flanging a blank of magnetic material similarly along opposite end portions thereof; embossing the blank at a pair of corresponding locations on each end portion thereof with the bosses formed thereby extending to a peripherally flanged portion thereof; partially cutting a portion of each boss from the blank without detaching the same from the blank; forming each of said portions into inwardly directed projections; cutting said end portions from the blank to form a pair of mated housings; associating the mated housings with their flanged peripheries in opposition and a portion of the peripheral portions forming a common face therefor; disposing magnetic material sandwiched between the corresponding projections to said face; disposing non-magnetic material between the magnetic material and the housing in alinement with the bosses to form magnetic gaps; disposing flux producing means on the magnetic material; and, filling the housings with epoxy resin and curing same to make a permanent erase head.

References Cited

UNITED STATES PATENTS

| | | | |
|---|---|---|---|
| 2,320,566 | 6/1943 | Carlile | 29—416 X |
| 2,384,145 | 9/1945 | Voity et al. | 29—416 X |
| 2,950,355 | 8/1960 | Moehring | 179—100.2 |
| 3,222,461 | 12/1965 | Wood et al. | 179—100.2 |

JOHN F. CAMPBELL, *Primary Examiner.*

JOHN L. CLINE, ROBERT W. CHURCH, *Assistant Examiners.*